(12) United States Patent
Feller

(10) Patent No.: US 8,136,837 B2
(45) Date of Patent: Mar. 20, 2012

(54) FOLDED AIRBAG FOR A MOTOR VEHICLE

(75) Inventor: Jens Feller, Illerkirchberg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/585,288

(22) Filed: Sep. 10, 2009

(65) Prior Publication Data

US 2010/0001500 A1 Jan. 7, 2010

Related U.S. Application Data

(63) Continuation of application No. PCT/EP2008/002083, filed on Mar. 14, 2008.

(30) Foreign Application Priority Data

Mar. 14, 2007 (DE) .......................... 10 2007 013 101

(51) Int. Cl.
B60R 21/20 (2006.01)

(52) U.S. Cl. .................................... 280/743.1

(58) Field of Classification Search ............... 280/743.1, 280/728.1–732

See application file for complete search history.

(56) References Cited

U.S. PATENT DOCUMENTS

| | | | |
|---|---|---|---|
| 5,899,490 A * | 5/1999 | Wipasuramonton et al. ........................ | 280/730.2 |
| 6,110,094 A | 8/2000 | Wallentin et al. | |
| 6,176,509 B1 * | 1/2001 | Kawaguchi et al. ....... | 280/728.1 |
| 6,224,092 B1 * | 5/2001 | Sakamoto et al. .......... | 280/730.2 |
| 6,231,070 B1 * | 5/2001 | Sunabashiri et al. ...... | 280/730.2 |
| 6,279,944 B1 | 8/2001 | Wipasuramonton et al. | |
| 6,331,015 B1 * | 12/2001 | Doxey et al. ................ | 280/743.1 |
| 6,371,518 B1 * | 4/2002 | Kalandek et al. .......... | 280/743.1 |
| 6,565,118 B2 * | 5/2003 | Bakhsh et al. ............. | 280/730.2 |
| 7,380,815 B2 * | 6/2008 | Rose et al. .................. | 280/730.2 |
| 7,614,650 B2 * | 11/2009 | Yokota ........................ | 280/730.2 |
| 7,614,655 B2 * | 11/2009 | Hasebe ....................... | 280/743.1 |
| 7,631,892 B2 * | 12/2009 | Ishikawa et al. ........... | 280/743.1 |
| 2003/0155759 A1 | 8/2003 | Abe | |
| 2005/0070414 A1 | 3/2005 | Schneider et al. | |
| 2005/0206141 A1 * | 9/2005 | Ishikawa et al. .............. | 280/731 |

FOREIGN PATENT DOCUMENTS

DE 10 2005 015 519 A1 10/2006
EP 0 940 301 A1 9/1999

* cited by examiner

Primary Examiner — Paul N Dickson
Assistant Examiner — Timothy Wilhelm
(74) Attorney, Agent, or Firm — Foley & Lardner LLP

(57) ABSTRACT

A folded airbag for a motor vehicle, which can be inflated in case of a crash, having a first rolled folding created by rolling up a first airbag section, and a second rolled folding created by rolling up a second airbag section. The spatial directions, along which the two airbag sections are rolled up to form a rolled folding are oriented at an angle to each other.

5 Claims, 20 Drawing Sheets

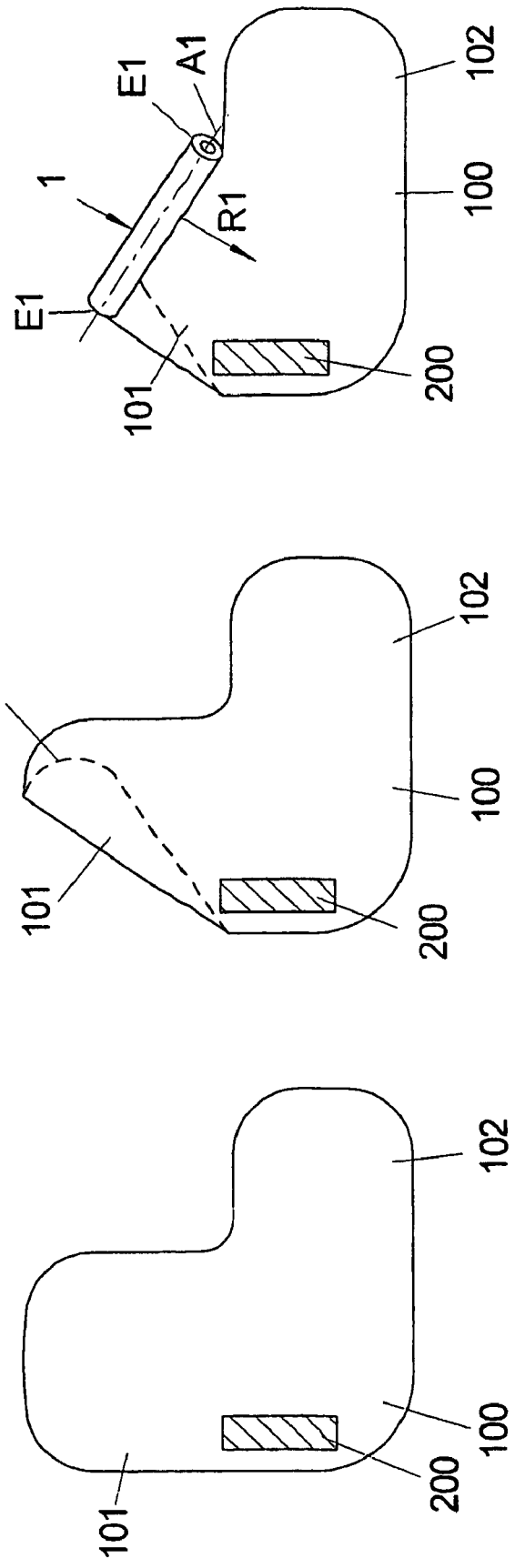

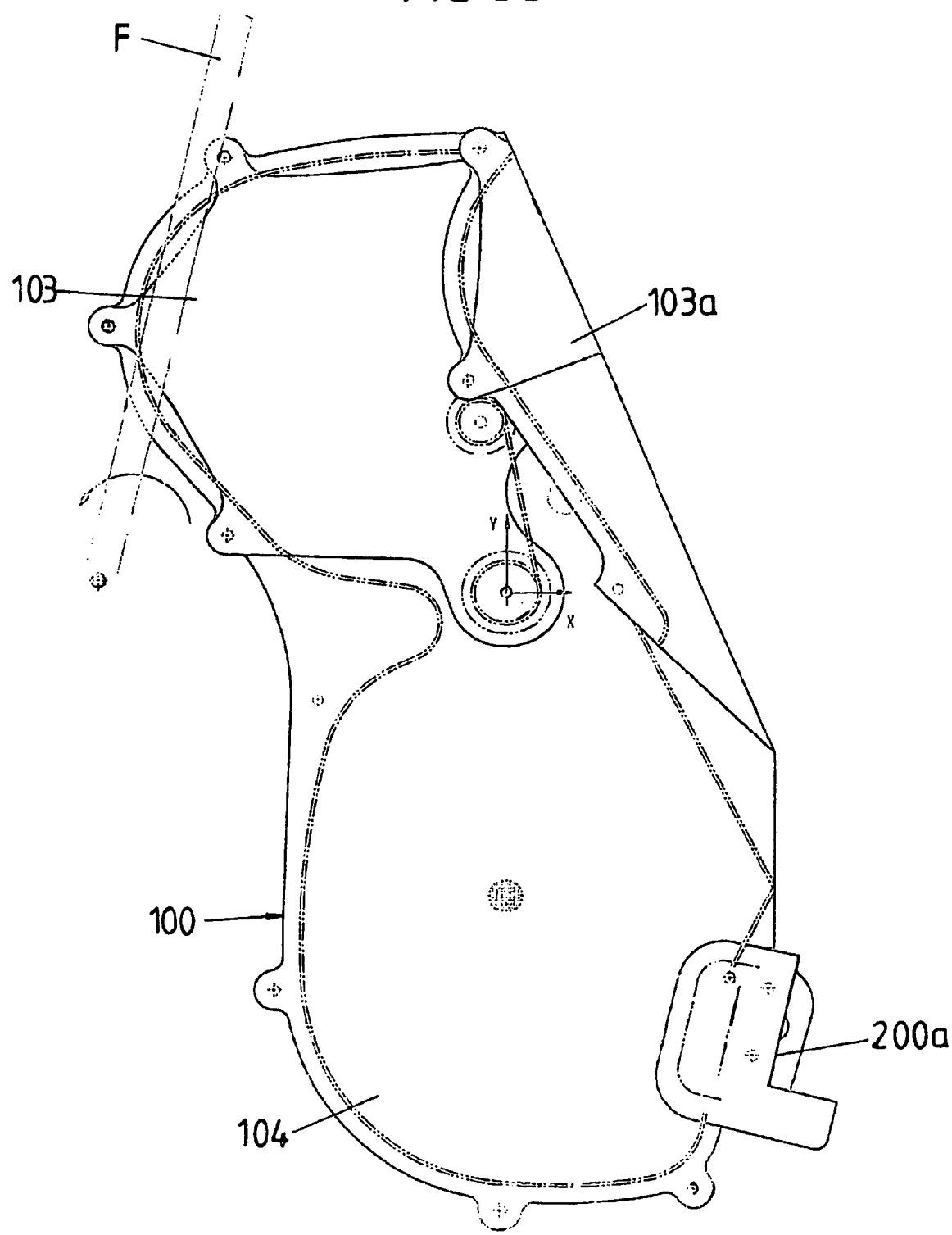

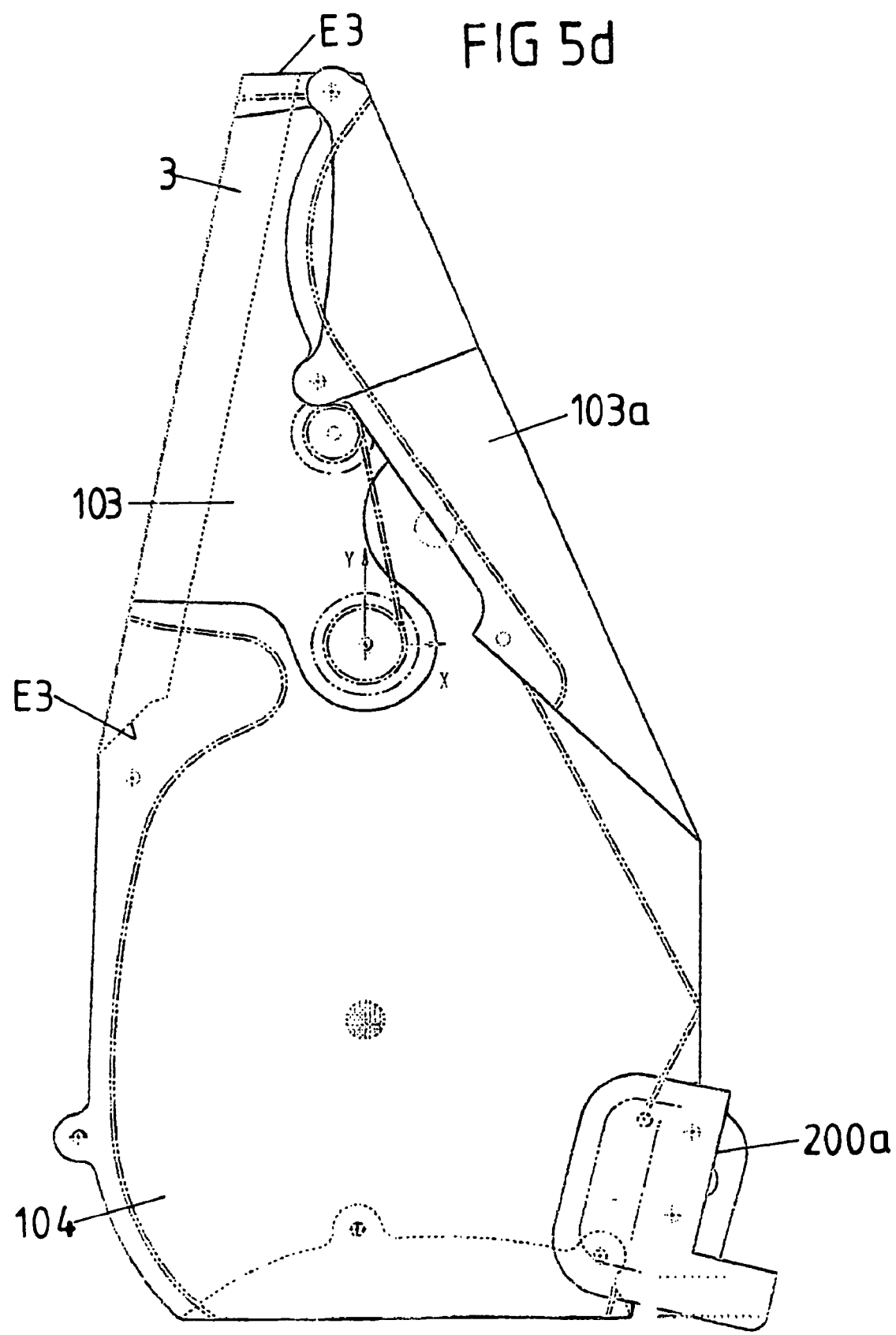

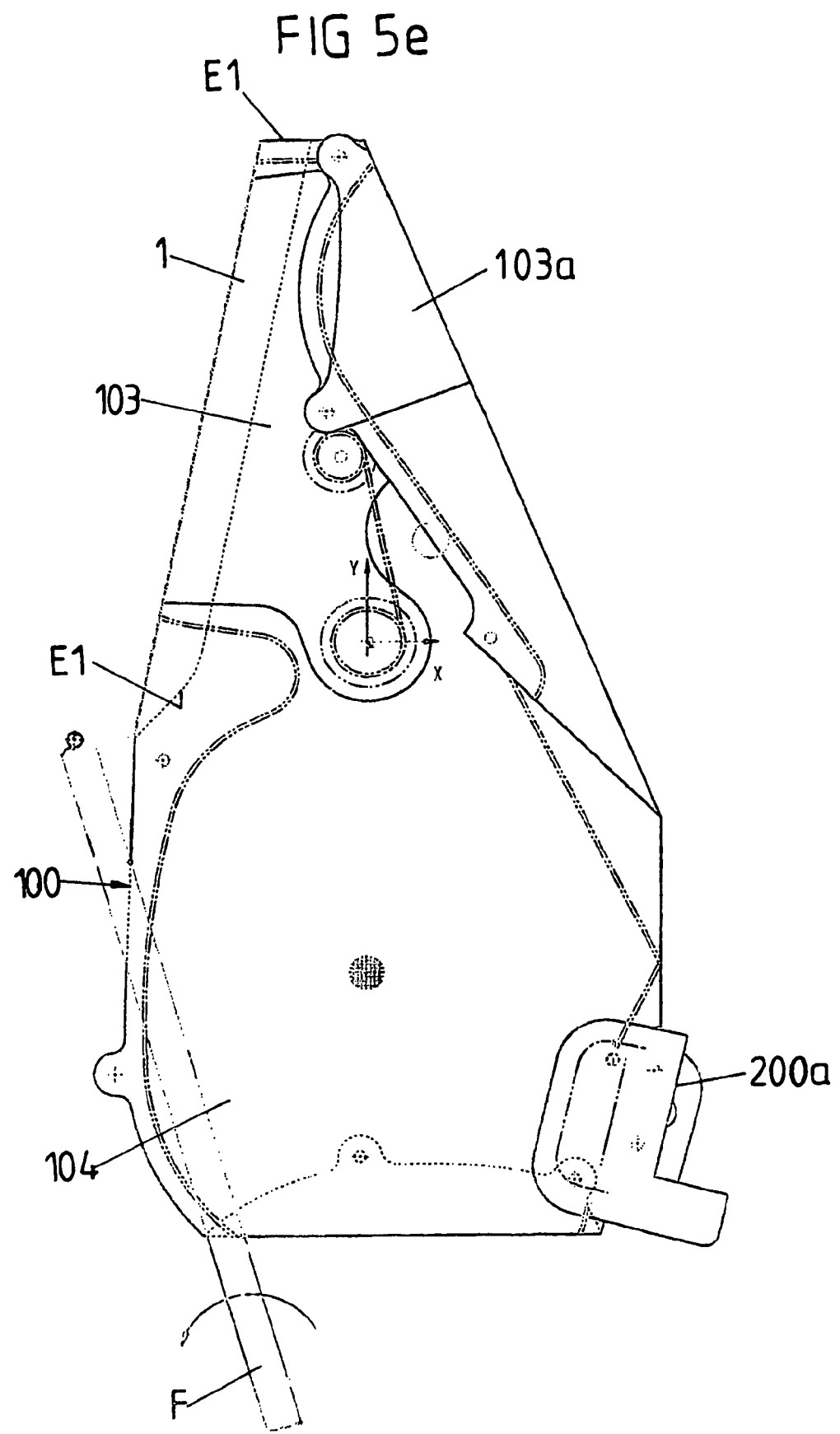

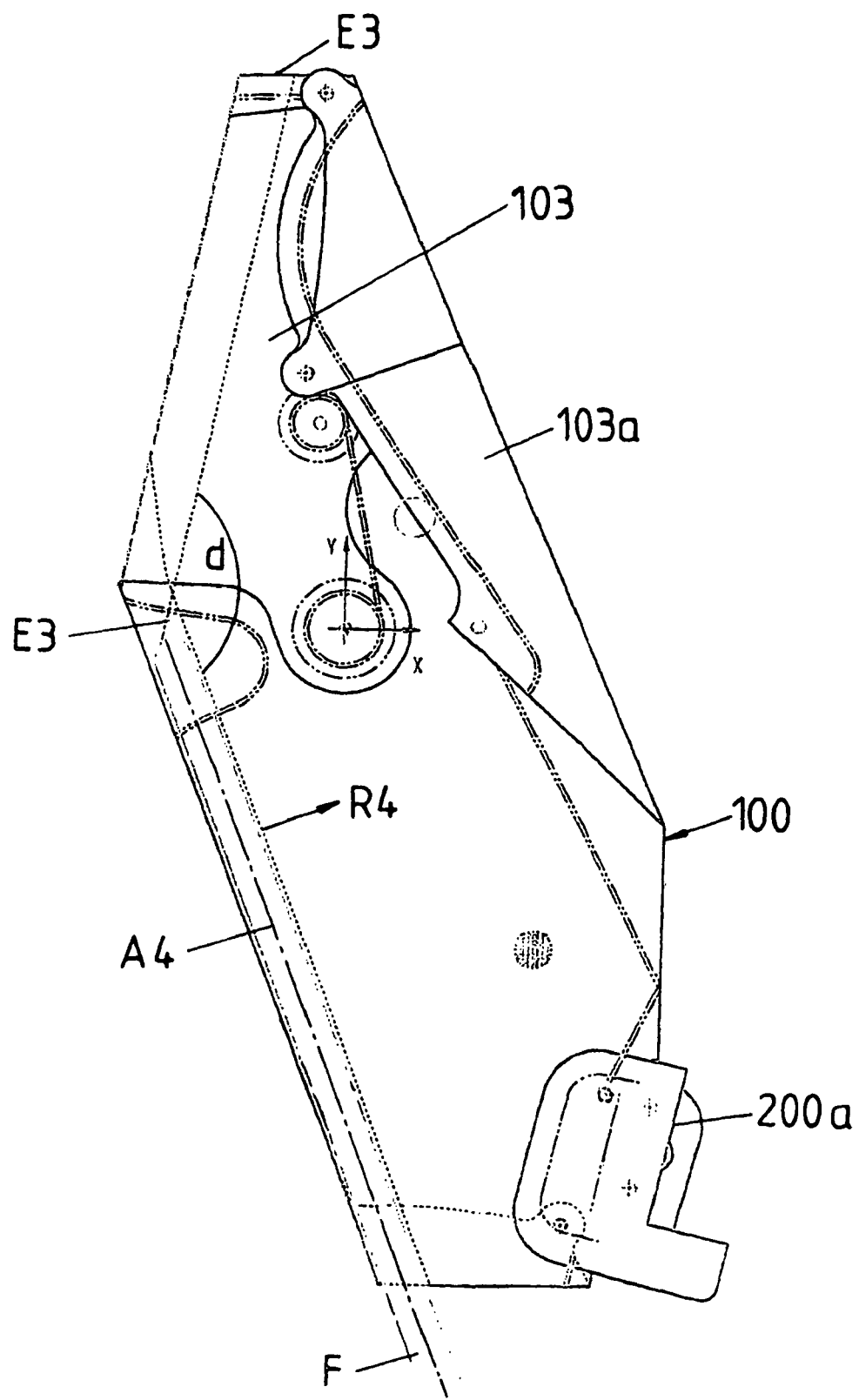

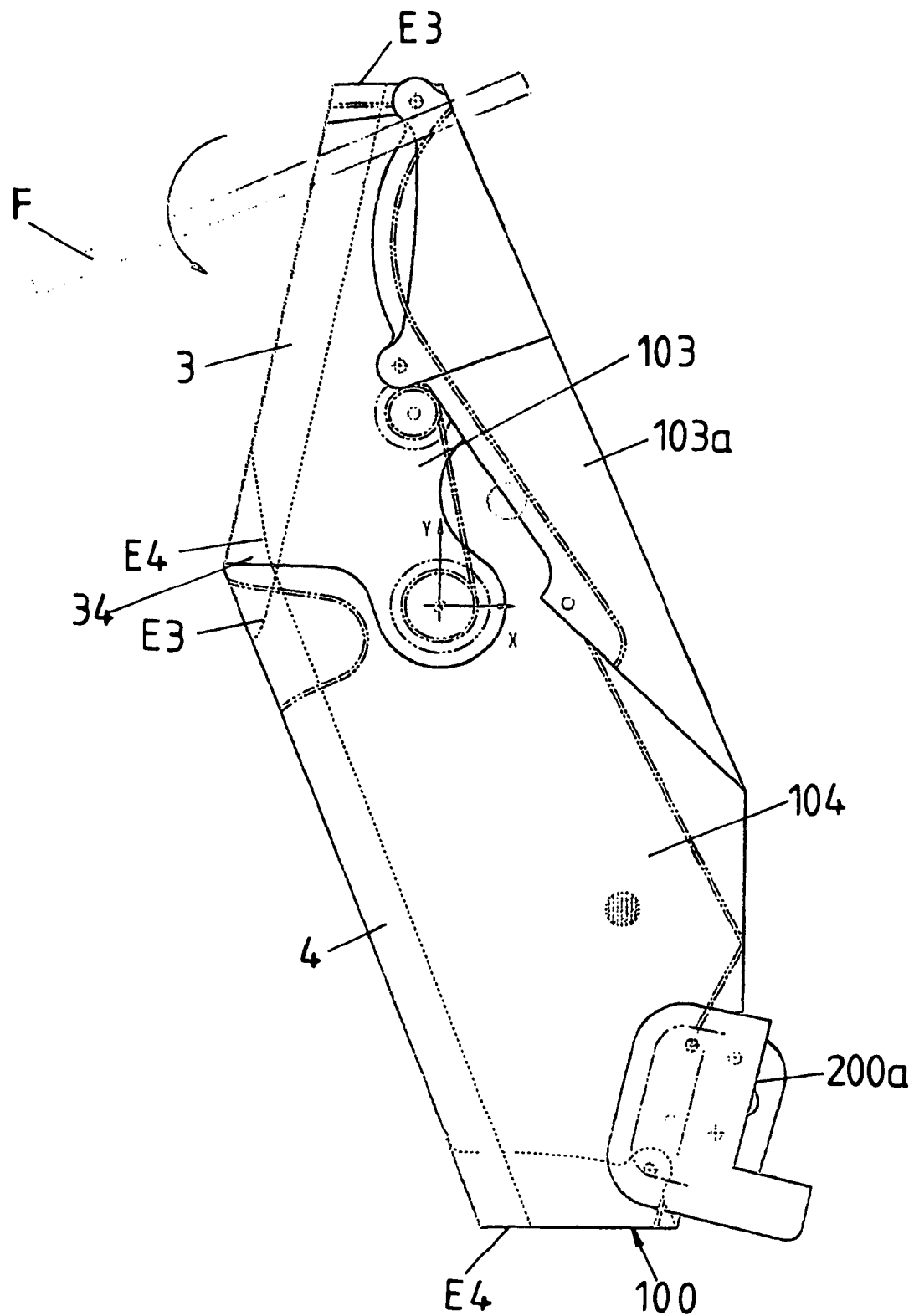

FOLDED AIRBAG FOR A MOTOR VEHICLE

CROSS-REFERENCE TO RELATED PATENT APPLICATIONS

This application is a Continuation of International Application Number PCT/EP2008/002083, filed Mar. 14, 2008, which was published in German on Sep. 18, 2008 as WO 2008/110382. The foregoing International Application is incorporated herein by reference in its entirety.

BACKGROUND

The invention relates to a folded airbag for an airbag module for installation into a motor vehicle which can be inflated in case of a crash—for protection of vehicle occupant or of a person being outside of the motor vehicle depending on its installation side.

Such an airbag comprises a first rolled folding created by rolling up a first airbag section as well as a second rolled folding created by rolling up a second airbag section.

The airbag is integrated in its folded status into an airbag module which is to be installed into a motor vehicle and which has an inflating device for instance in form of a gas generator which allows for the filling of the airbag with gas in case of a crash, so that it is unfolded and forms in its deflated status a restraining arrangement in form of a gas cushion for the person to be protected. The inflation of the airbag in a case of crash shall comprise such cases in which the airbag is being inflated by the gas generator only in occurrence of a vehicle collision detected for instance by an acceleration sensor as well as in such cases in which the gas generator is being activated already by detection of an imminent collision for instance by a so called pre-crash sensor and fills the airbag with gas.

Airbags of this kind having at least section-wise a rolled folding in its folded status are for instance known from EP 0 940 301 A1, U.S. Pat. No. 5,899,490, U.S. Pat. No. 6,110,094, U.S. Pat. No. 6,279,944 B1 as well as U.S. Pat. No. 6,371,518 B1 whereby in particular in U.S. Pat. No. 5,899,490 an airbag is described having two rolled foldings extending parallel to each other.

SUMMARY

The invention is based on the object to improve an airbag of the mentioned kind in particular in view of a targeted unfolding.

According to an exemplary embodiment of the invention, the spatial directions (rolled directions) along which the two airbag sections of the airbag according to the invention are rolled up for formation of a respective rolled folding are oriented at an angle to each other, i.e. extending in an finite angle but not reverse to each other in particular such that two straight lines crossing each other whereby each of the straight lines run along one of the two spatial directions.

Due to the angular orientation of the spatial directions along which the two rolled foldings are formed by rolling up of each respective airbag section the two resulting rolled foldings are also running at an angle to each other.

By an appropriate selection of the spatial directions or the resulting angle which specifies the angular position of the two resulting rolled foldings to each other, it is possible to adjust specifically the unfolding direction of the airbag as well as the velocity of the unfolding.

Such an airbag folding is in principle applicable to all airbag types, also for instance for airbags for side and head airbag modules independent of the fact if these are integrated into the seat or the door, for front airbag modules, knee airbag modules and so on.

The angle between the spatial directions along which the two airbag sections are rolled up for forming a respective rolled folding is for instance between 10° and 170°, in particular between 30° and 150° or rather narrow between 45° and 135° or between 75° and 105°. In particular also an angle in the area of 90° (vertical orientation of the two spatial directions along which is rolled up) can be envisaged.

According to an exemplary embodiment of the invention the two rolled foldings overlap each other so that at least one part of the first rolled folding is located in the second section of the airbag whereby by rolling up the same the second rolled folding is formed and at least one part of the first rolled folding is rolled up along the second spatial direction by rolling up the second airbag section for forming the second rolled folding.

Hereby it can be envisaged on the one hand that the folding resulting from the two rolled foldings has a first folded area in which the two rolled foldings overlap each other as well as at least one further folding area which is formed without an overlapping by one of the two rolled foldings whereby in particular also two further folding areas can be provided which are formed by one of the respective two rolled foldings (without overlap).

On the other hand it can be provided that the two rolled foldings overlap completely so that at least one of the two rolled foldings does not have any area which does not overlap with the other rolled folding, whereby in particular it can also be provided that none of the two rolled foldings has an area which does not overlap with the other rolled folding.

If necessary, the folded airbag can also have more than two rolled foldings of which at least two are rolled up along different spatial directions.

According to a specific exemplary embodiment of this variant according to the invention three rolled foldings are provided of which the one rolled folding overlaps with the other two rolled foldings whereby the latter ones were rolled up either along spatial directions being angular to each other or along spatial directions being parallel or reverse to each other.

It can be further provided that the one (third) rolled folding is formed by the rolling up of two airbag sections in which beforehand in each case a rolled folding is created whereby in particular successively at first an airbag area having a first rolled folding and subsequently another airbag area having a second rolled folding are rolled up. Hereby, according to a variant the rolling direction along which the airbag is rolled up for forming a third rolled folding can basically run along the extending direction of the two first rolled foldings.

The folding resulting from the single rolled foldings has at least two folding sections bent to each other. According to a continuation of this embodiment a (central) folding section of the resulting folding is provided from which two further folding sections are bent.

In order to form a rolled folding it can be provided that the corresponding airbag section (along a defined rolling direction and around a defined rolling axis) will be rolled up at least three times, in particular at least five times, whereby each single rolling up leads to the formation of an approximate annular area in its cross section of the respective airbag section which encloses 360° and which forms in its cross section a part of a spiral.

Before, during and after the formation of the single rolled foldings it can be furthermore provided to form an inversion into the airbag or to revert the airbag at least once.

In case of an airbag provided with at least two rolled foldings the airbag can be for instance basically L-shaped in a flatly spreaded (unfolded) condition whereby both arms form in each case one of the airbag sections which is rolled up to form a rolled folding in each case. Thereby the rolling up of the airbag sections formed by each arm of the L-shaped airbag blank along the extending directions of each arm takes place if applicable in as much that the two rolled foldings formed by rolling up of the arms overlap in a transition area.

Furthermore, the folded airbag according to an exemplary embodiment of the invention can be provided as a one-chamber or as a multiple-chamber airbag, in the last mentioned case for instance being composed of a head- and/or thorax- and/or pelvis-chamber or another combination of multiple (at least two) chambers. In case of a multi-chamber airbag the airbag areas of one or more chambers can be rolled in a corresponding rolled folding.

In as much as the airbag is a so called head-thorax-airbag (which as a matter of course can also serve additionally the protection of the pelvis) an airbag section serving for instance the protection of the head on the one hand as well as an airbag section serving the protection of the upper body (thorax-pelvis) on the other hand can be rolled up along each of the spatial directions by forming each of the rolled foldings whereby subsequently an additional third rolled folding can be created which comprises the two (rolled up beforehand) airbag sections and whereby it can be provided in particular that (along one predetermined spatial direction of the third rolled folding) at first the airbag section serving the protection of the head and subsequently the airbag section serving the protection of the upper body of an occupant are rolled up along the said third spatial direction for forming the third rolled folding.

Furthermore, the rolled folding according to an exemplary embodiment of the invention can also be used for folding only one part of an airbag to be folded while the other areas of the airbag are folded in a different manner. It is solely important that the airbag has at least two rolled foldings in the folded status which had been rolled up along spatial directions extending in an angle to each other; beyond that the airbag can also have other foldings.

BRIEF DESCRIPTION OF THE DRAWINGS

Further details and advantages of the invention become apparent in the following description of examples on the basis of the figures:

FIG. 2a shows a second embodiment for creating multiple rolled foldings in case of the L-shaped airbag blank.

FIG. 2b shows a second embodiment for creating multiple rolled foldings in case of the L-shaped airbag blank.

FIG. 2c shows a second embodiment for creating multiple rolled foldings in case of the L-shaped airbag blank.

FIG. 5b shows a further embodiment for multitude folding steps at the folding of an airbag blank applying three rolled foldings according to FIG. 5a.

FIG. 5d shows a further embodiment for multitude folding steps at the folding of an airbag blank applying three rolled foldings according to FIG. 5c.

FIG. 5e shows a further embodiment for multitude folding steps at the folding of an airbag blank applying three rolled foldings according to FIG. 5d.

FIG. 5f shows a further embodiment for multitude folding steps at the folding of an airbag blank applying three rolled foldings according to FIG. 5e.

FIG. 5g shows a further embodiment for multitude folding steps at the folding of an airbag blank applying three rolled foldings according to FIG. 5f.

FIG. 5l shows a further embodiment for multitude folding steps at the folding of an airbag blank applying three rolled foldings according to FIG. 5k.

DETAILED DESCRIPTION

Figure 1A:
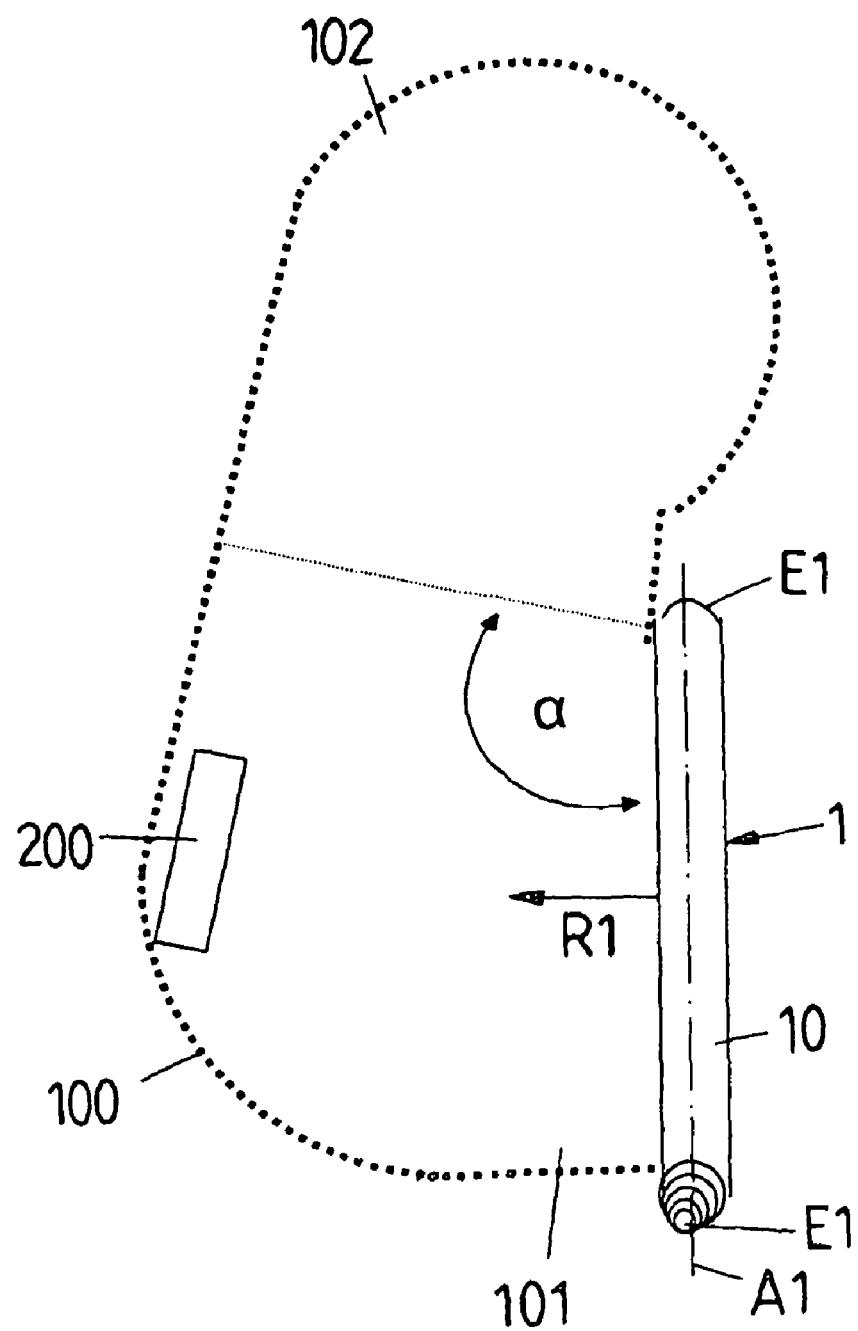
FIG. 1a shows a flatly spreaded, L-shaped airbag at the creation of a first rolled folding.

FIG. 1a shows an airbag 100 for an airbag module which can be inflated in case of a crash by a gas generator 200 arranged in the instant airbag 100, in a flatly spreaded condition, in which the airbag 100 has basically an L-shaped form with a first arm 101 and a second arm 102.

Thereby the airbag section 11 formed by the first arm of the airbag is rolled up along a first spatial direction R1 (rolling direction) which corresponds basically with the extending direction of the airbag section 101 formed by said arm so that a first rolled folding 1 of airbag 100 is created which extends along a rolled folding axis A1 between two ends E1. The rolled folding axis A1 runs basically crosswise to the spatial direction R1 along which the first airbag section 101 was rolled up for creating the rolled folding 1 and indicates the longside extending direction of the first rolled folding 1 between its both ends E1.

According to FIG. 1b subsequently the second airbag section 102 formed by the second arm of the L-shaped airbag blank is rolled up along a second spatial direction R2 (Rollrichtung) for creating a second rolled folding, whereby the second spatial direction R2 runs basically vertical (in an angle β of a little bit less than 90°) to the first spatial direction R1. This means that the angle α between the rolled folding axes A1, A2 of the two rolled foldings 1, 2 is basically a vertical angle which in the present case is a little bit more than 90°.

The second rolled folding 2 created by rolling up the second airbag section 102 along a second spatial direction R2 extends thereby along a rolled folding axis A2 longish between two ends E2.

Since the rolled folding axes A1, A2 of the two rolled foldings 1, 2 run vertically to the spatial directions R1, R2 along which in each case an airbag section 101, 102 was rolled up for forming the respective rolled folding 1, 2 it applies for angle β by which the two spatial directions R1, R2 cross each other: β=180°−α. Elsewise expressed the sum of angle α by which the two rolled folding axes A1, A2 cross each other and angle β by which the two spatial directions R1, R2 cross each other is 180°.

Figure 1B:
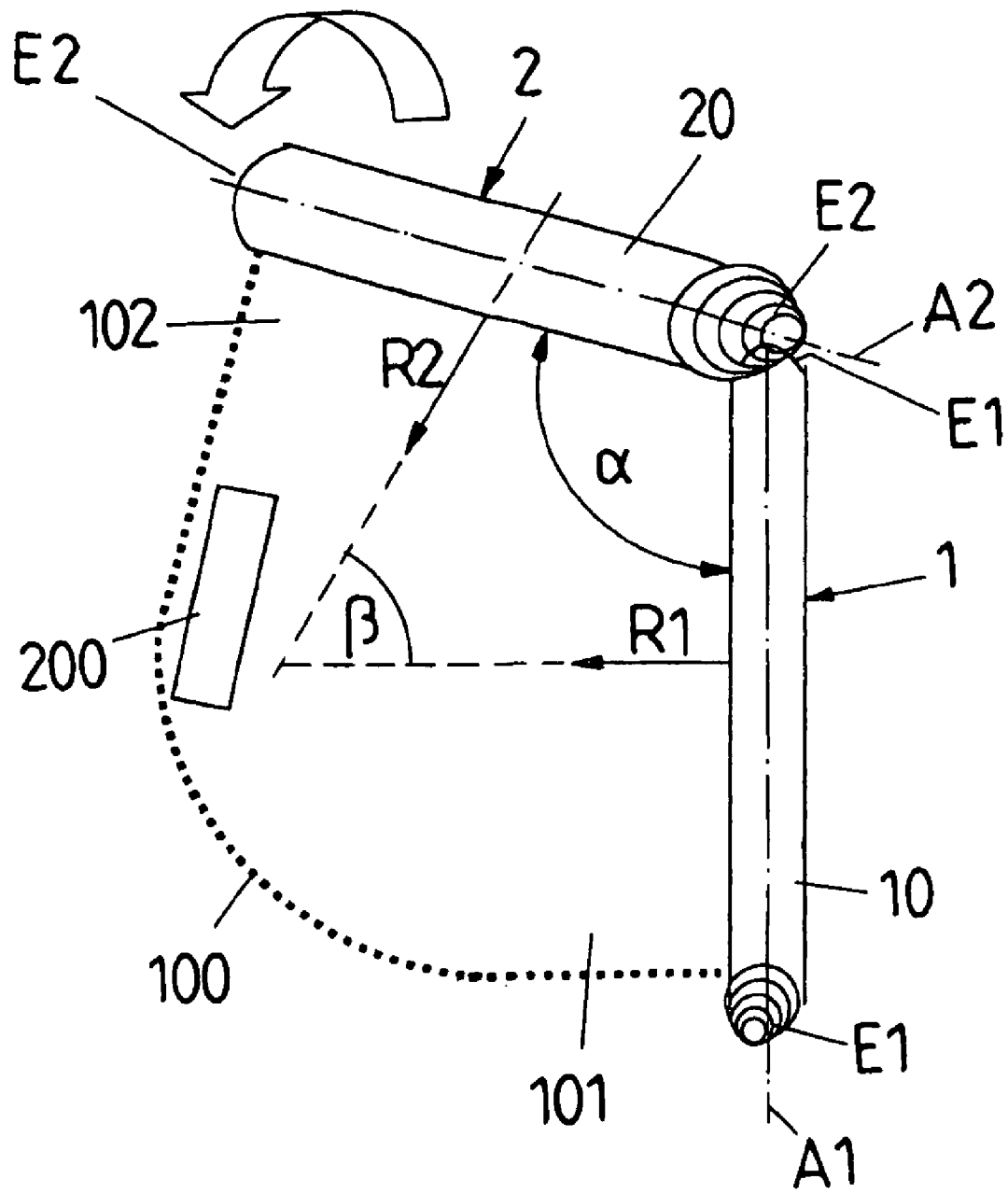
FIG. 1b shows the airbag from FIG. 1a at the creation of a second rolled folding.

In the condition shown in FIG. 1b in which the airbag sections 101, 102 formed by the two arms of the L-shaped airbag blank were each rolled up for forming a respective rolled folding until the two rolled foldings 1, 2 almost adjoin to the neighbouring ends E1, E2 each of the rolled foldings 1, 2 is formed by a multitude of folding layers 10, 20 surrounding the respective rolled folding axes A1, A2.

Figure 1C:
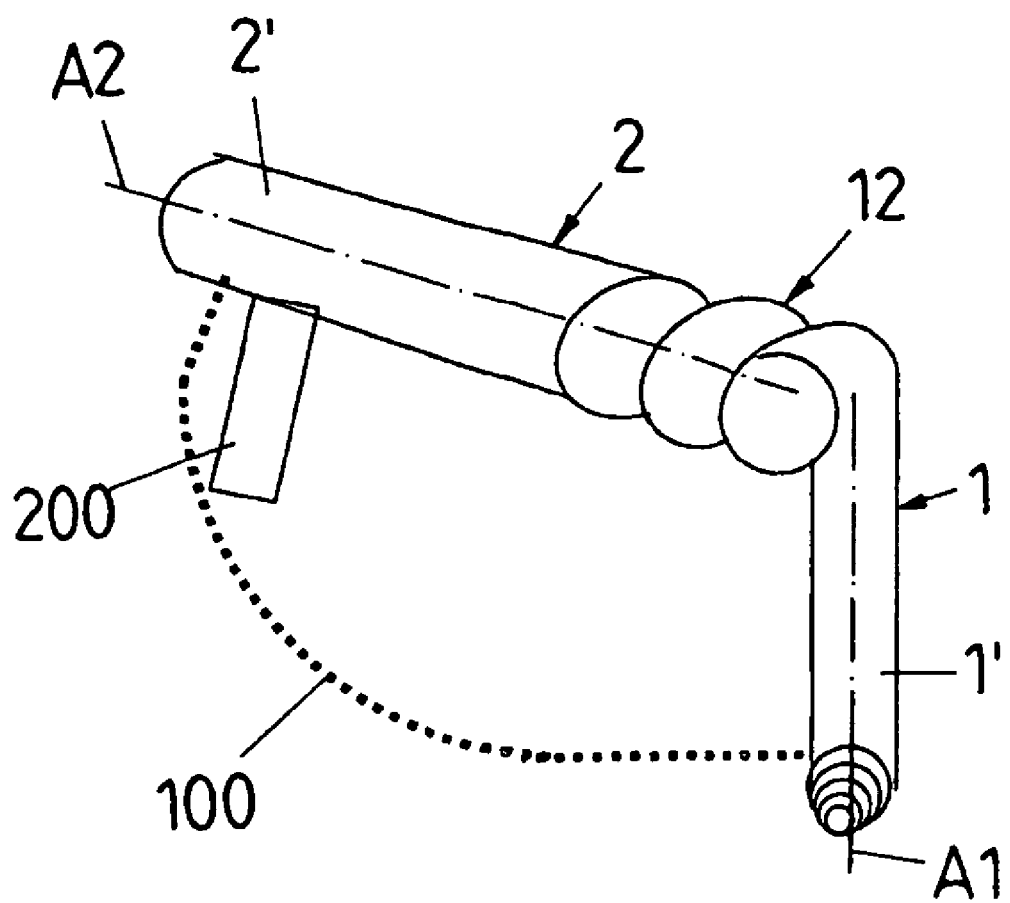
FIG. 1c shows the airbag from FIGS. 1a and 1b after termination of both rolled foldings.

As shown in FIG. 1c, in case the second rolled folding 2 is expanded by further rolling up the corresponding airbag section 102 such that a part of the first rolled folding 1 is also rolled up along the second spatial direction R2 and hereby is being integrated into the second rolled folding 2, a resulting folding is created which comprises an overlapping area 12 between the two rolled foldings 1, 2.

This overlapping area 12 is thus created in such a manner that the second airbag section by which rolling up the second rolled folding 2 was formed, comprised a part of the first rolled folding 1 created beforehand according to FIG. 1a. Hereby a part of the first rolled folding 1 was rolled up by creating the second rolled folding 2 and was integrated into the second rolled folding 2 by which the transition or overlapping area 12 between first and second rolled folding 1, 2 was created. In each case a folding area 1' or 2' of the resulting folding follows the overlapping area 12 whereby the first rolled folding 1 and the second rolled folding 2 are provided in each case in straight form meaning without overlapping with the respective other rolled folding 2, 1. Thereby the folding area 2' in which the second rolled folding 2 is provided in straight form as well as the overlapping area 12 in which the two rolled foldings 1, 2 overlap extend along a common rolled folding axis A2 from which the folding area 1' in which the first rolled folding is provided in straight form is bent along the first rolled folding axis A1.

The rolling up of the respective airbag section 101, 102 in way of each arm of airbag 100 along a respective spatial direction R1 or R2 around a corresponding rolled folding axis A1, A2 can be advantageously effected in such a manner that the respective airbag section 101, 102 is rolled up at least three times, in particular at least five times around 360°, whereby each single rolling up around 360° leads to the formation of a in its cross section approximate annular airbag section which extends over an angle of 360° and which forms a part of a spiral in its cross section. A five time rolling up of an airbag section leads accordingly—regarding the cross section—in the corresponding airbag section to five (open) rings, which together form a spiral, as is for instance recognizable in FIG. 1b at in each case one end E1, E2 of the local rolled foldings 1, 2.

Figure 2D:
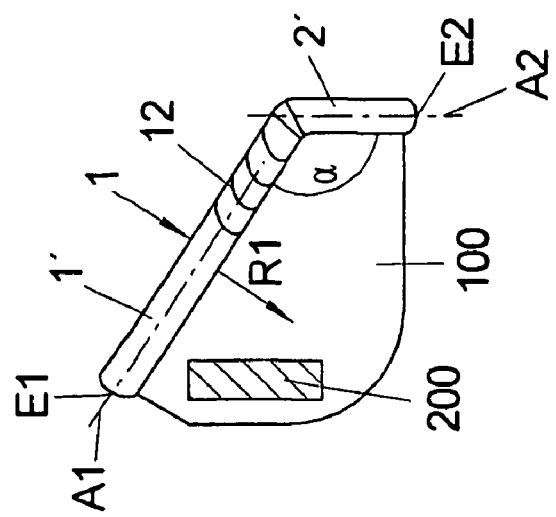
FIG. 2d shows a second embodiment for creating multiple rolled foldings in case of the L-shaped airbag blank.

In FIGS. 2a to 2f a modification of the embodiments of FIGS. 1a to 1c is shown, whereby here also according to FIG. 2a an airbag 100 with a L-shaped airbag blank in a flatly spreaded condition is the starting point having a first arm 101 and a second arm 102 and being provided with a gas generator 200 for inflating the airbag 100 in its interior.

According to FIG. 2b, however, the first airbag section 101 of the airbag 100 forming the first arm is turned once by creating a fold 103 before forming the rolled folding so that the first airbag section 101 does not extend any longer vertical on one side but rather angular to the second airbag section 102.

According to FIG. 2c the first airbag section 101 is then rolled up along a first spatial direction R1 for forming a first rolled folding 1, whereby the first rolled folding R1 extends basically along the extending direction of the edge of the first airbag section 101 which extends to the second airbag section 102 in a tilted (angular) manner after formation of the beforementioned fold 103.

As result a first rolled folding R1 is formed which extends between two free ends E1 along a rolled folding axis A1 in fact basically vertical to the first spatial direction R1 along which the first airbag section 101 was rolled up for forming the first rolled folding 1.

Subsequently, the second airbag section 102 forming the second arm of the L-shaped airbag blank is rolled up for forming a second rolled folding 2 along a second spatial direction R2 according to FIG. 2d, which runs along the extending direction of the arm of the L-shaped airbag blank forming the second airbag section 102.

The resulting second rolled folding 2 extends between two free ends E2 along a second rolled folding axis A2 which runs with an angle α of more than 90° relative to the first rolled folding axis A1. This is attributed to the fact that due to the tilted course of the first spatial direction R1 to the extending direction of the second airbag section 102 and therefore also to the second spatial direction R2 the spatial directions R1, R2 along which the two airbag sections 101, 102 were rolled up for forming the rolled foldings 1, 2 are orientated to each other with an angle β of noticeable less than 90°.

Figure 2E:
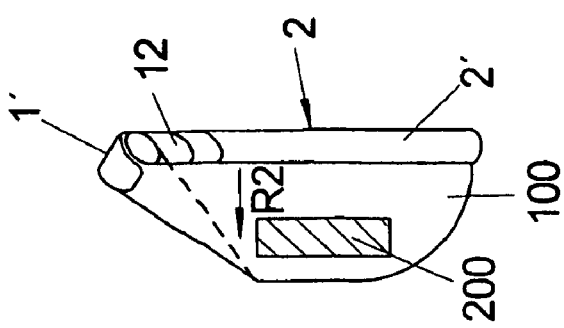
FIG. 2e shows a second embodiment for creating multiple rolled foldings in case of the L-shaped airbag blank.

According to FIG. 2e the second airbag section 102 is even further rolled up so that the second rolled folding 2 overlaps with the first rolled folding by forming an overlapping area 12. In other words, the second airbag section 102 for forming the second rolled folding 2 is rolled up in as much that a part of the first rolled folding 1 is also rolled up along the second spatial direction R2 and therefore a part of the first rolled folding 1 is integrated into the second rolled folding 2 by forming a transition area 12.

At hand the second airbag section 102 is rolled up along the second spatial direction R2 in as much that as a remaining straight folding area 1' of the first rolled folding 1 merely a small part of the first rolled folding 1 remains, whereby the bigger part of the first rolled folding 1 is at first integrated into the second rolled folding 2 or more precisely, into the overlapping area 12.

According to FIG. 2f subsequently the first rolled folding 1 is again rolled up along the first spatial direction R1 so that the overlapping area 12 is increased or may be enlarged by now integrating a part of the straight folding area 2' of the second rolled folding 2 into the first rolled folding 1. Simultaneously, also the straight folding area 1' of the first rolled folding 1 is again enlarged.

Figure 2F:
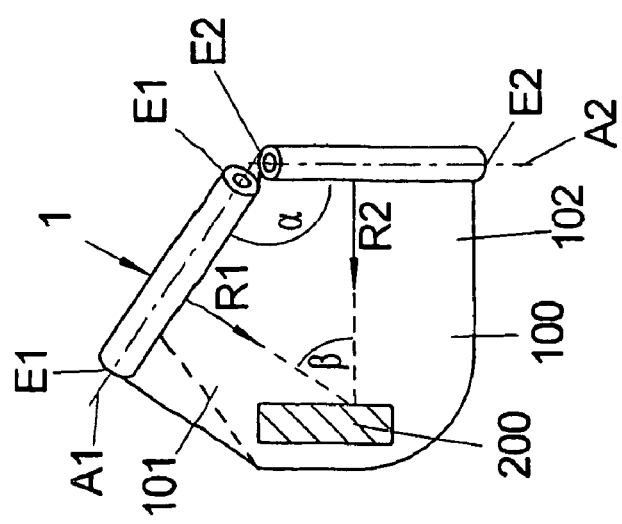
FIG. 2f shows a second embodiment for creating multiple rolled foldings in case of the L-shaped airbag blank.

The resulting folding of airbag 100 recognizable in FIG. 2f comprises therefore a transition or overlapping area 12 from which a straight folding area 1' of the first rolled folding 1 as well as a straight folding 2' of the second rolled folding 2 stick out whereby the straight folding area 1' of the first rolled folding 1 extends together with the transition or overlapping area 12 along a first folding axis A1 and the straight folding area 2' of the second rolled folding 2 is bent along a rolled folding axis A2 from the overlapping area 12 by forming the above-mentioned angle α.

Figure 3:
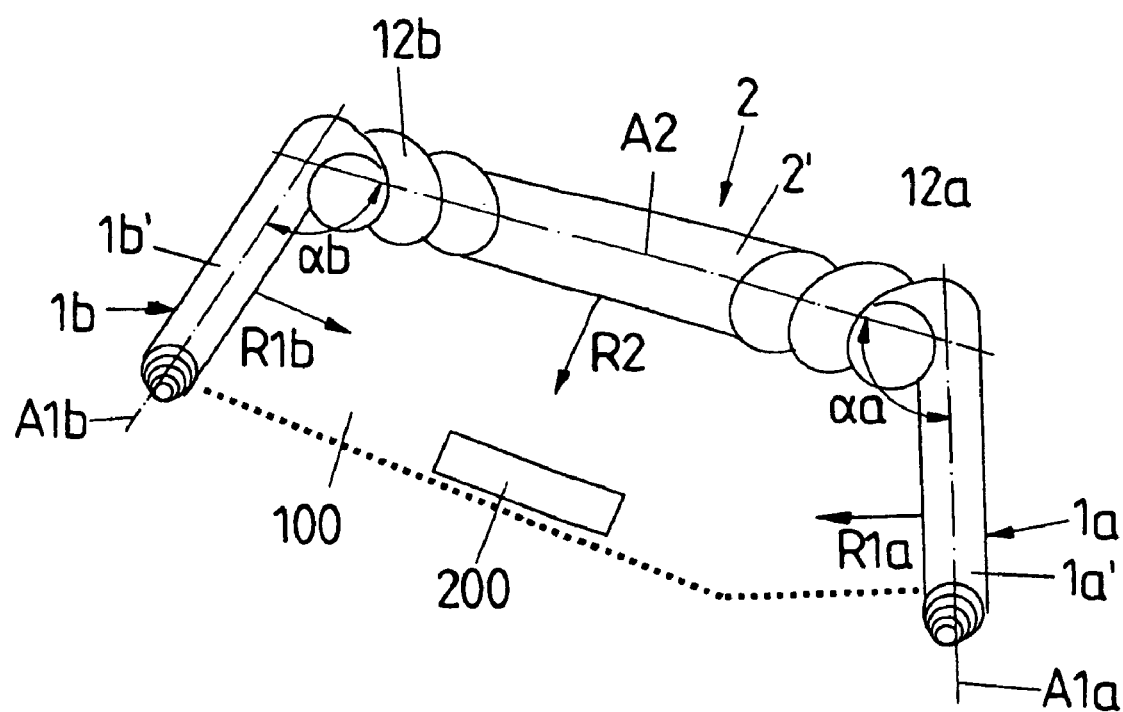
FIG. 3 shows a folded airbag resulting from three rolled foldings.

FIG. 3 shows a modification of the assemblies of FIGS. 1a to 1c and 2a to 2f according to which two first rolled foldings 1a, 1b are provided which are formed by rolling up in each case one section of airbag 100 along spatial directions R1a, R1b which are basically reverse and only slightly tilted to each other and which in each case extend along a rolled folding axis A1a, A1b.

Each of the two first rolled foldings 1a, 1b is part of a second rolled folding 2 in a transition or overlapping area 12a or 12b which is formed by rolling up a further airbag section along a further spatial direction R2 and which extends along a second rolled folding axis A2.

The second spatial direction R2 along which the second rolled folding 2 is rolled up extends basically vertical to the two first spatial directions R1a, R1b along which the first two rolled foldings 1a, 1b were rolled up so that accordingly also the angles αa and αb between each of the first rolled folding axis A1a, A1b and the second rolled folding axis A2 account basically for 90°.

The resulting folding has therefore according to FIG. 3 a central section which is formed by the straight folding area 2' of the second rolled folding 2 and to which along the second rolled folding axis A2 on each of the two front sides in each case one of the overlapping areas 12a, 12b follows to each of the first rolled foldings 1a, 1b. The first two rolled foldings 1a, 1b are bent from the second rolled folding 2 with their respective straight folding area 1a', 1b' by the respective above-mentioned angle αa, αb.

In FIGS. 4a to 4d steps are shown for the assembly of an arrangement similar to the folded airbag according to FIG. 3.

Figure 4A:
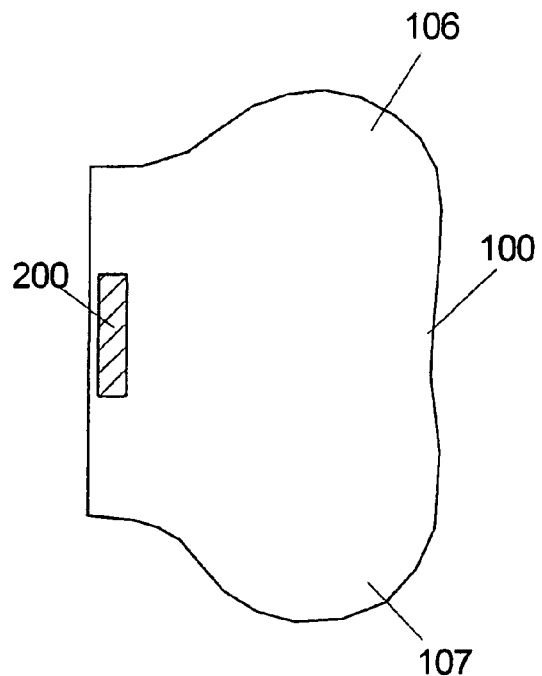
FIG. 4a shows a step in case of folding an airbag blank applying three rolled foldings.
Figure 4B:
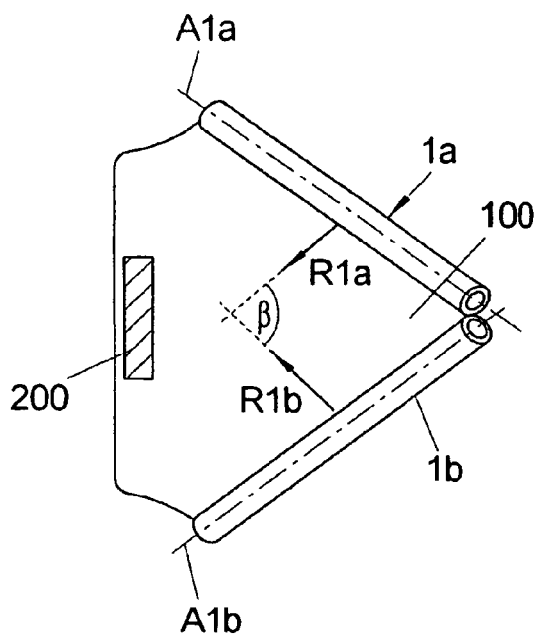
FIG. 4b shows a step in case of folding an airbag blank applying three rolled foldings.

According to FIG. 4a the starting point is an airbag 100 with a gas generator 200 for inflating the airbag arranged insight of the airbag having two borderside airbag sections 106, 107 which according to FIG. 4b are rolled up along in each case one of two spatial directions R1a, R1b which are basically vertical to each other for forming in each case a first rolled folding 1a, 1b.

The initially resulting first rolled foldings 1a, 1b have according to FIG. 4b—as a consequence of the spatial directions R1a, R1b being vertical to each other during the folding process—rolled folding axis A1a, A1b extending vertical to each other, whereby the two first rolled foldings 1a, 1b approach in an angle of approximately 90° and have neighbouring free ends.

According to FIG. 4c or according to FIG. 4d the airbag 100 is subsequently rolled up starting from the point in which the two first rolled foldings 1a, 1b approach in an angle of approximately 90° in such a manner that they form neighbouring free ends, along a second spatial direction R2 for creating a second rolled folding 2, whereby the second spatial direction R2 forms approximately the bisecting line of the (right) angle β, which includes the two first spatial directions R1a, R1b.

Figure 4C:
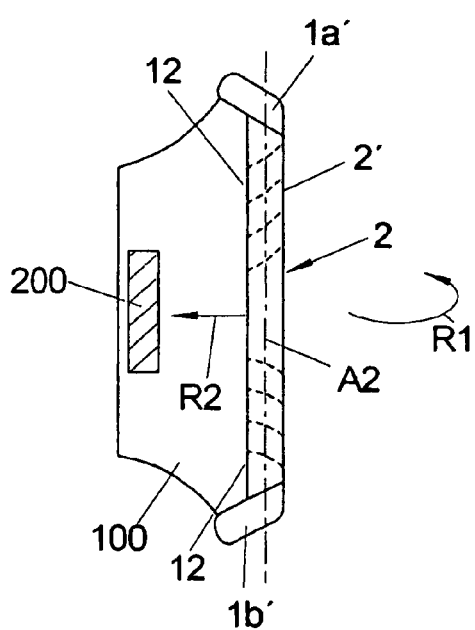
FIG. 4c shows a step in case of folding an airbag blank applying three rolled foldings.
Figure 4D:
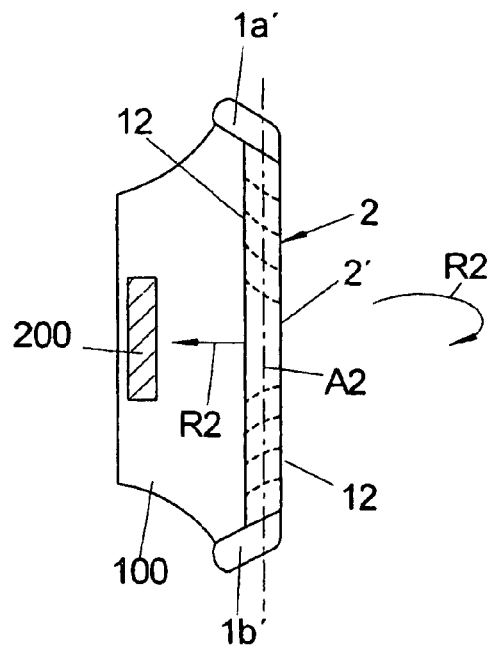
FIG. 4d shows a step in case of folding an airbag blank applying three rolled foldings.

The difference between the approach according to FIG. 4c and the approach according to FIG. 4d consists in the fact that in the first mentioned case the airbag 100 is rolled upwards for forming the second rolled folding 2, e.g. that the second rolled folding 2 is formed in front of the same side of the airbag in front of which also the two first rolled foldings 1a, 1b are located while in the second mentioned case the airbag 100 is rolled downwards for forming the second rolled folding 2, e.g. that the second rolled folding 2 is formed in front of the side of the airbag 100 which is averted to the two first rolled foldings 1a, 1b.

In both cases the resulting folding according to FIG. 4c or 4d has a straight folding area 2' of the second rolled folding 2 which merges along the second rolled folding axis A2 on each front side into a transition or overlapping area 12 from which in each case a straight folding area 1a' or 1b' of the two first rolled foldings 1a, 1b is bent.

The straight folding area 2' of the second rolled folding 2 is thereby on hand formed in a very small manner compared to the overlapping areas 12 of the resulting folding since the airbag section forming the second rolled folding 2 by rolling up the same is basically completely traversed by the first rolled foldings 1a, 1b almost striking each other as shown in FIG. 4b.

Due to the different positions of the single rolled foldings to each other as described above in FIGS. 1a to 4d as well as due to the different degrees of the overlapping of the rolled foldings it is possible to determine specific unfolding directions of the airbag in case of inflation and otherwise also different unfolding velocities.

The preferred unfolding direction of a folded airbag according to the invention depends specifically on the fact along which direction the rolled foldings formed for the folding of the airbag are rolled up. In addition, the unfolding velocity depends essentially on the degree of overlapping of the rolled foldings.

In case of a sufficient overlapping of multiple rolled foldings it can be sufficient to only fix one of these rolled foldings, for instance the second rolled folding (2) in case of the embodiment shown in FIGS. 4a to 4d since then the further rolled foldings (1a, 1b) are kept in their folded position due to the overlapping areas (12).

The embodiment shown in FIGS. 4a to 4d is in particular also applicable—beside the use as a part of a side airbag module—for front airbags (driver or co-driver side) as well as for knee and head airbag modules. In case of using the airbag shown in FIGS. 4a to 4d in a head airbag module which for instance is to be fastened at the roof edge area of a motor vehicle it can be of an advantage to replace the gas generator 200 shown in FIGS. 4a to 4d by a gas generator with affiliated, longside extended gas lance.

Furthermore, it can be practicable—depending on the application—to provide the airbag 100—before, during or after creating the rolled foldings—with an inversion for instance by everting a part of the airbag sections 106, 107 to the inner side or to provide it with a folded layer for instance by turning one of the airbag sections 106, 107 one time.

In principle, the above exemplarily described airbag foldings, by using at least two rolled foldings, can be adapted to any airbag forms, whereby the spatial directions and therefore the angle of the rolled folding axes to each other as well as the ratio of the single rolled lengths are provided according to the circumstances in each single case, in particular to the desired unfolding direction and velocity.

Also the stream angle of the gas streaming from the gas generator into the airbag relative to the spatial orientation of the rolled foldings can be chosen in a variable manner so that a defined inflation characteristics of the respective airbag results from it.

For slim airbag packets the angle α between the rolled folding axes of two rolled foldings is preferably chosen such that the one rolled folding (1) is rolled helical into the second rolled folding (2) as shown in FIG. 1.

For optimizing angle α in which the rolled folding axes are oriented to each other or due to other reasons a respective airbag section can be provided with inversions, flaps, zig-zag-folds or the like before rolling up for forming a rolled folding so that these are folded in the respective rolled folding.

Of course, further folding steps of the airbag can occur even after creating the rolled foldings described above in the examples in order to further compact it or to bring it in a specific desired form.

Such additional folding steps are described for instance by means of the subsequently depicted embodiment of a folding process for a multiple-chamber, here specifically two-chamber, airbag 100 as shown in FIGS. 5a to 5m.

The airbag 100 (in form of a head-thorax airbag) has two airbag sections 103, 104 of which one is provided for forming an airbag chamber serving the protection of the head and the other is provided for forming an airbag chamber serving the protection of the upper body of an occupant.

In respect to the status of an airbag 100 assembled into a motor vehicle, the airbag section 103 serving the protection of the head rests, considered along the vertical vehicle axis z, above the airbag section 104 serving the protection of the upper body of a vehicle occupant if the corresponding airbag 100 is inflated with gas.

At first, however, the airbag 100 is to be stored together with the corresponding gas generator in a vehicle seat, namely in a compacted (folded) status by applying a folding process described subsequently by means of FIGS. 5a to 5m.

Figure 5A:
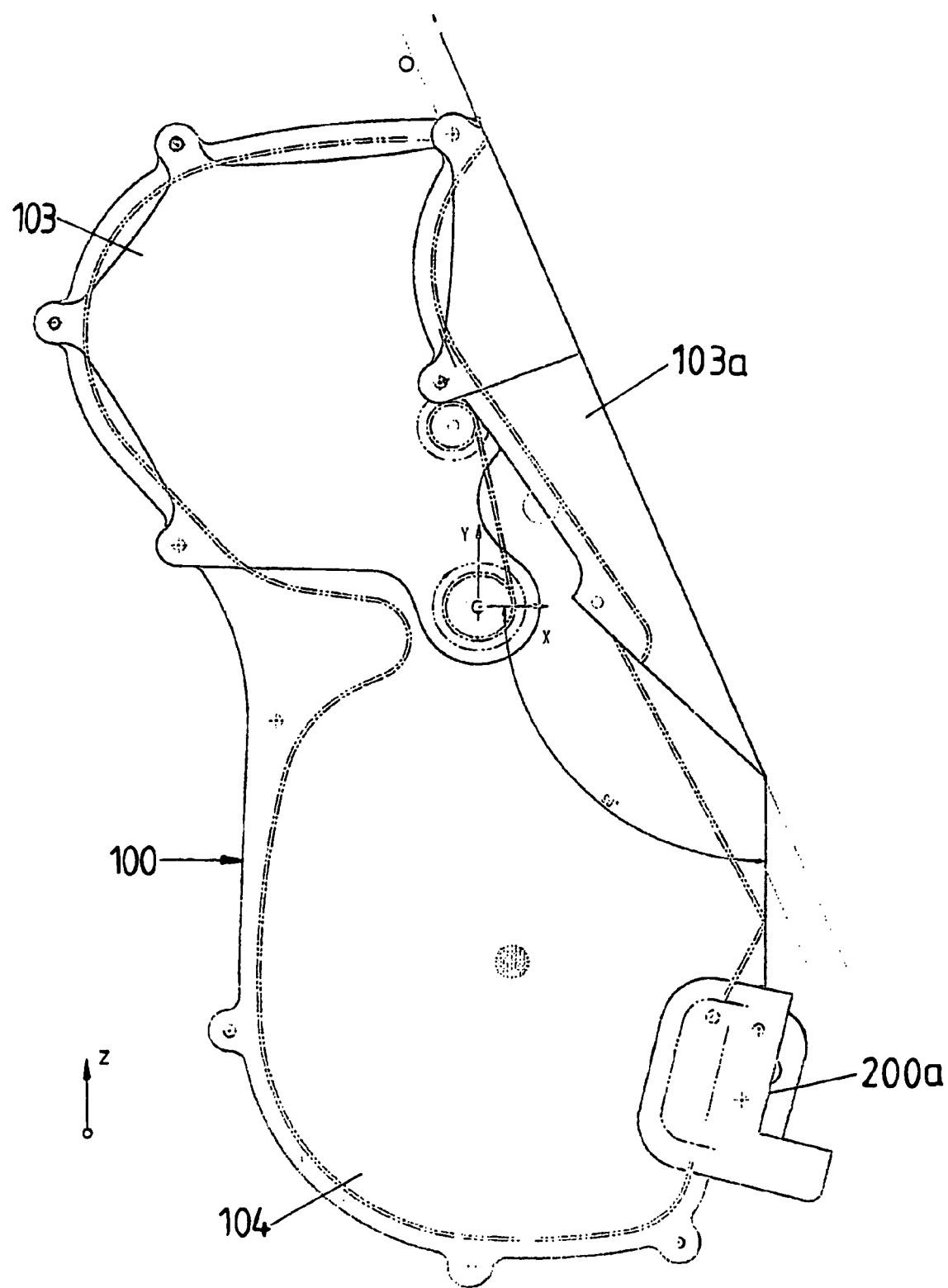
FIG. 5a shows a further embodiment for multitude folding steps at the folding of an airbag blank applying three rolled foldings.

According to FIG. 5a at first the first (serving the protection of the head, upper) airbag section 103 is once reverted (for instance by using a folding bracing) in a portion so that a single folding layer 103a is formed in the airbag 100, compare FIG. 5a.

Figure 5C:
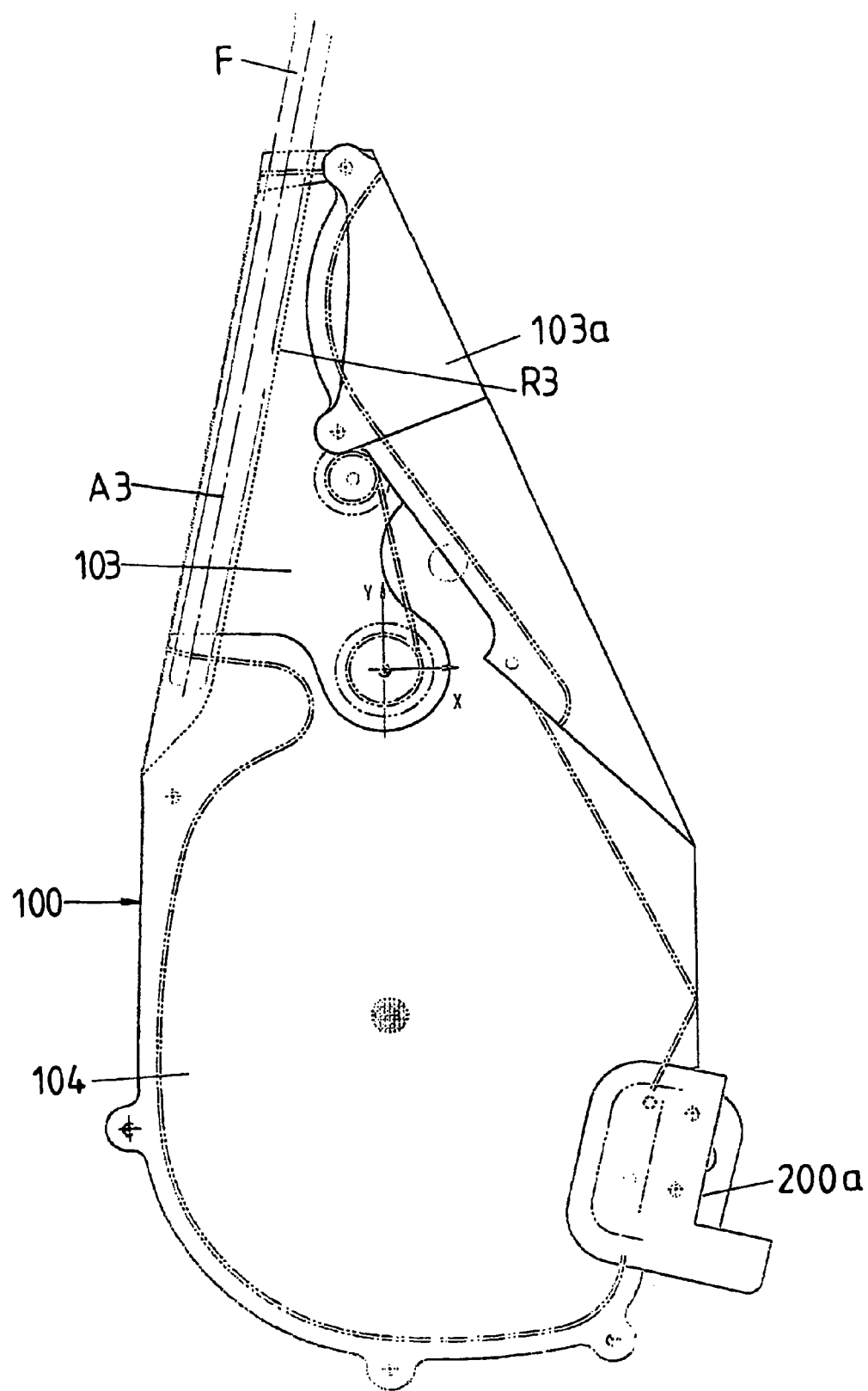
FIG. 5c shows a further embodiment for multitude folding steps at the folding of an airbag blank applying three rolled foldings according to FIG. 5b.

According to FIGS. 5b and 5c a longside extending folding bracing F is subsequently applied to an area of the first airbag section 103 averted to said folding 103a and that airbag section 103 is rolled up by rotation of the folding bracing F around the longitudinal axis A3 along a rolling direction R3 so that a rolled folding 3 is formed in said first airbag section 103. The completely rolled up rolled folding 3 extends according to FIG. 5d between the two ends E3 with a slight tilting against the vertical z, compare FIG. 5a.

Thereafter a folding bracing F is applied to the second (lower, serving the protection of the upper body of a vehicle occupant) airbag section 104 according to FIGS. 5e and 5f and the respective airbag section 104, to which also a reception or connecting area 200a for a gas generator can be assigned, is rolled up by rotating the folding bracing F around a longitudinal axis A4 along a rolling direction R4.

Each complete rotation of the folding bracing F (around 360°) corresponds thereby to a singular rolling up of the respective airbag section, so that an approximately circular airbag section is formed in its cross section. Thus, by multiple complete rotations of the folding bracing F approximately concentric (open) rings are created in the respective airbag section whereby the rings form a spiral.

As can specifically be seen in FIGS. 5f and 5g the second rolled folding 104 also extends between two ends E4 whereby the extending directions of the two rolled foldings 3, 4 enclose an angle α of less than 180°, i.e. the extending directions of the two rolled foldings 3, 4 are (slightly) tilted to each other. In other words, the extending directions of the two rolled foldings 3, 4 continue in a different, small angle tilted in respect to the vertical z, respectively, see FIG. 5a. Furthermore, the two rolled foldings 3, 4 overlap on their ends E3, E4 facing each other in an overlapping area 34.

Figure 5H:
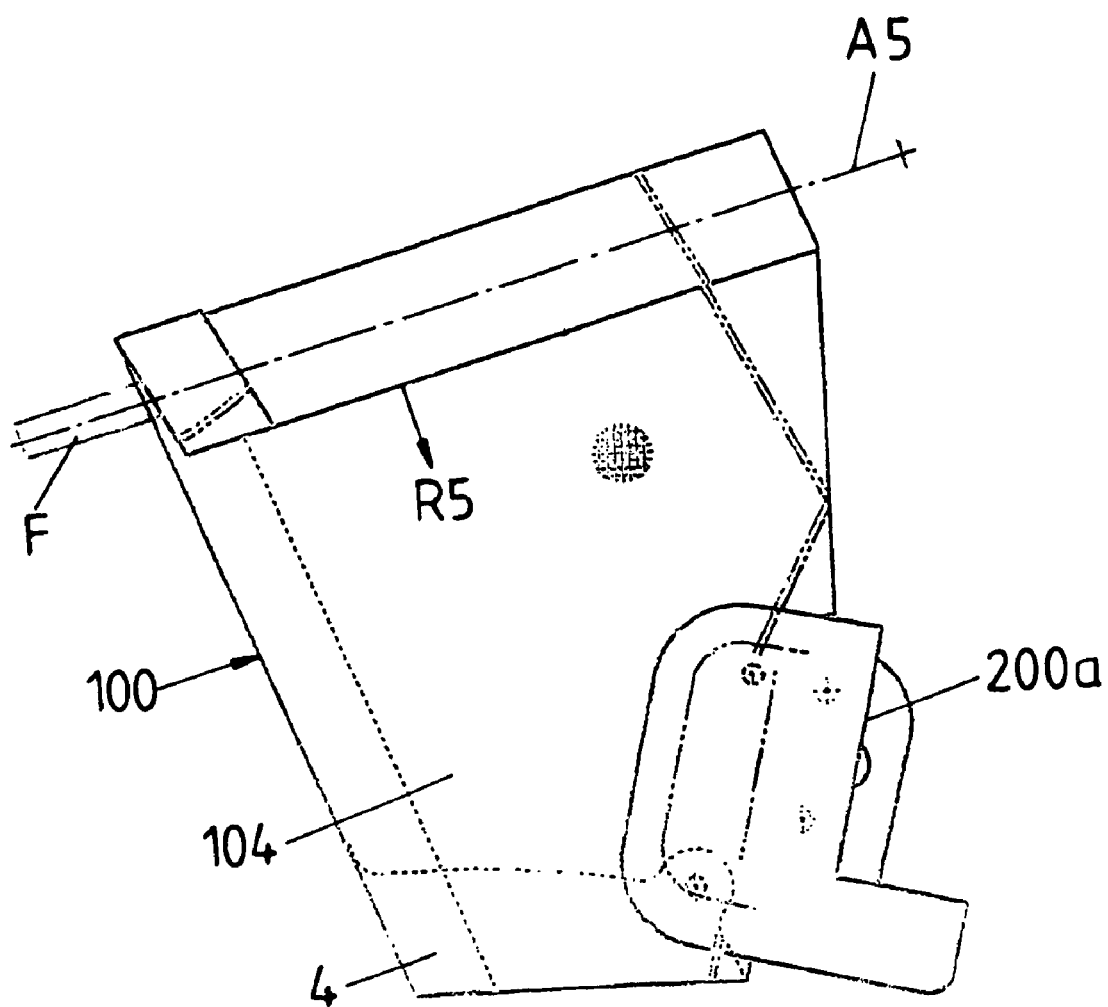
FIG. 5h shows a further embodiment for multitude folding steps at the folding of an airbag blank applying three rolled foldings according to FIG. 5g.
Figure 5I:
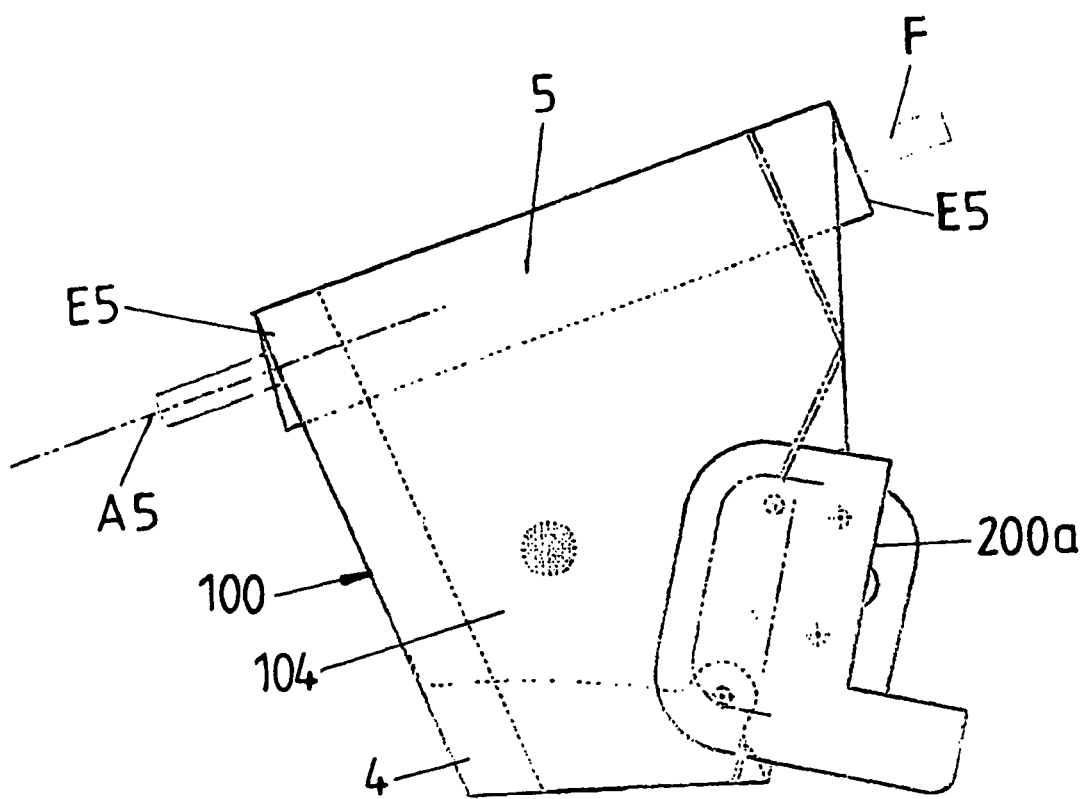
FIG. 5i shows a further embodiment for multitude folding steps at the folding of an airbag blank applying three rolled foldings according to FIG. 5h.
Figure 5J:
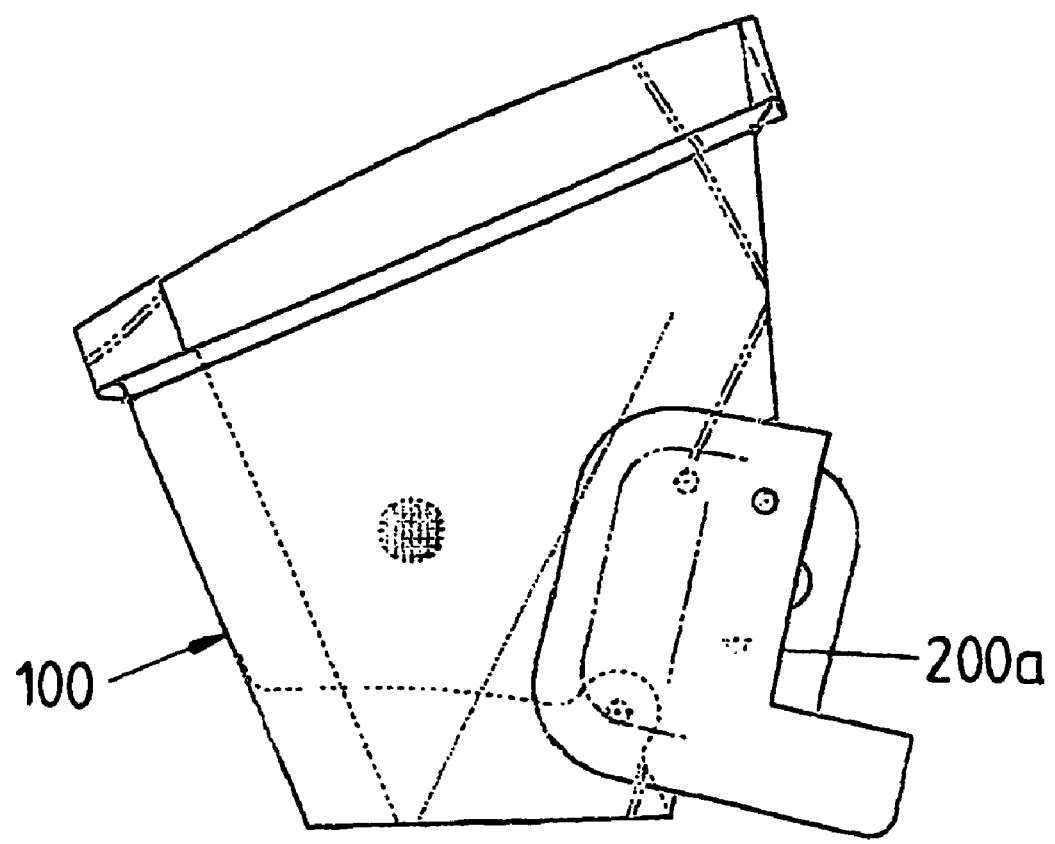
FIG. 5j shows a further embodiment for multitude folding steps at the folding of an airbag blank applying three rolled foldings according to FIG. 5i.
Figure 5K:
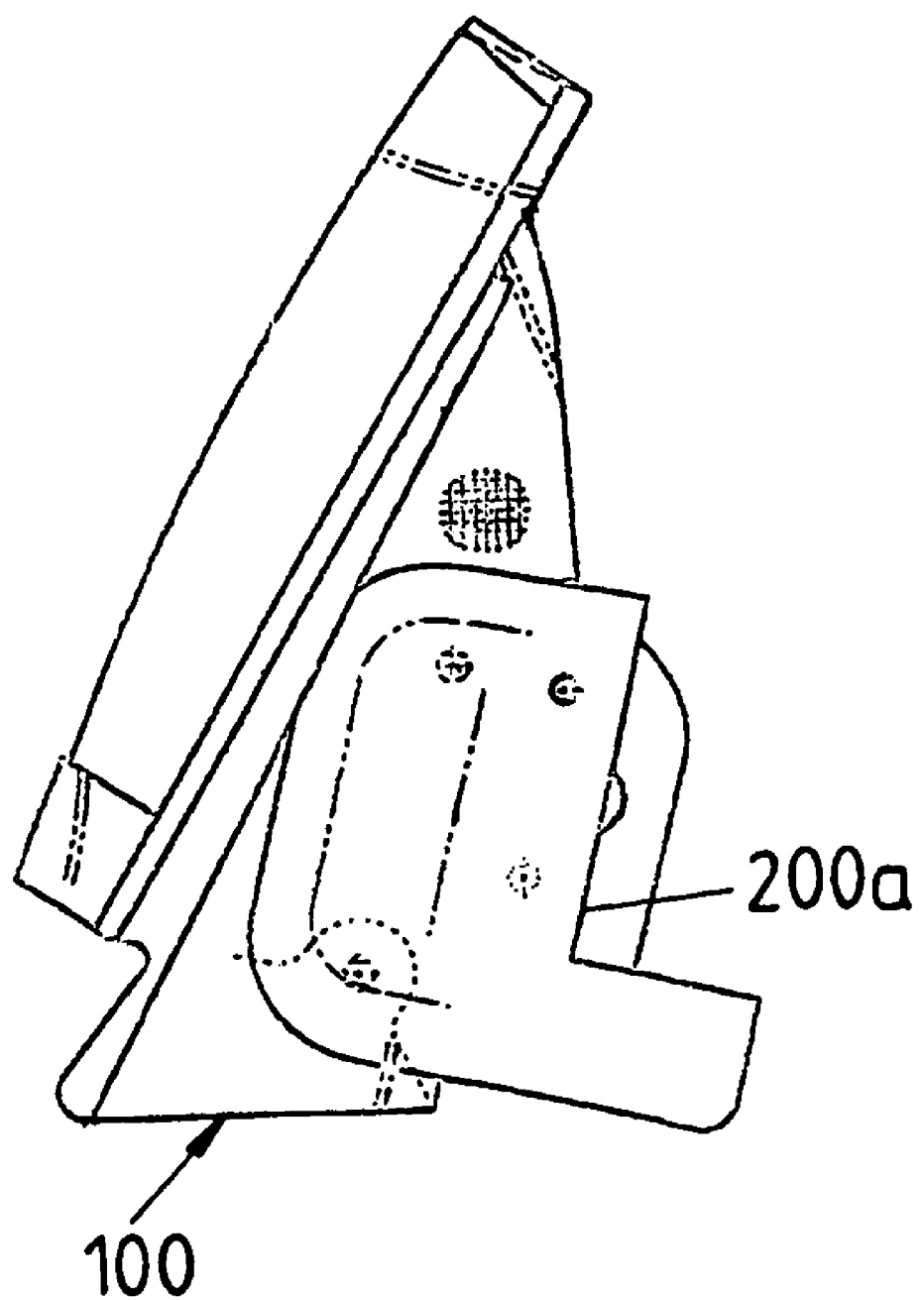
FIG. 5k shows a further embodiment for multitude folding steps at the folding of an airbag blank applying three rolled foldings according to FIG. 5j.
Figure 51:
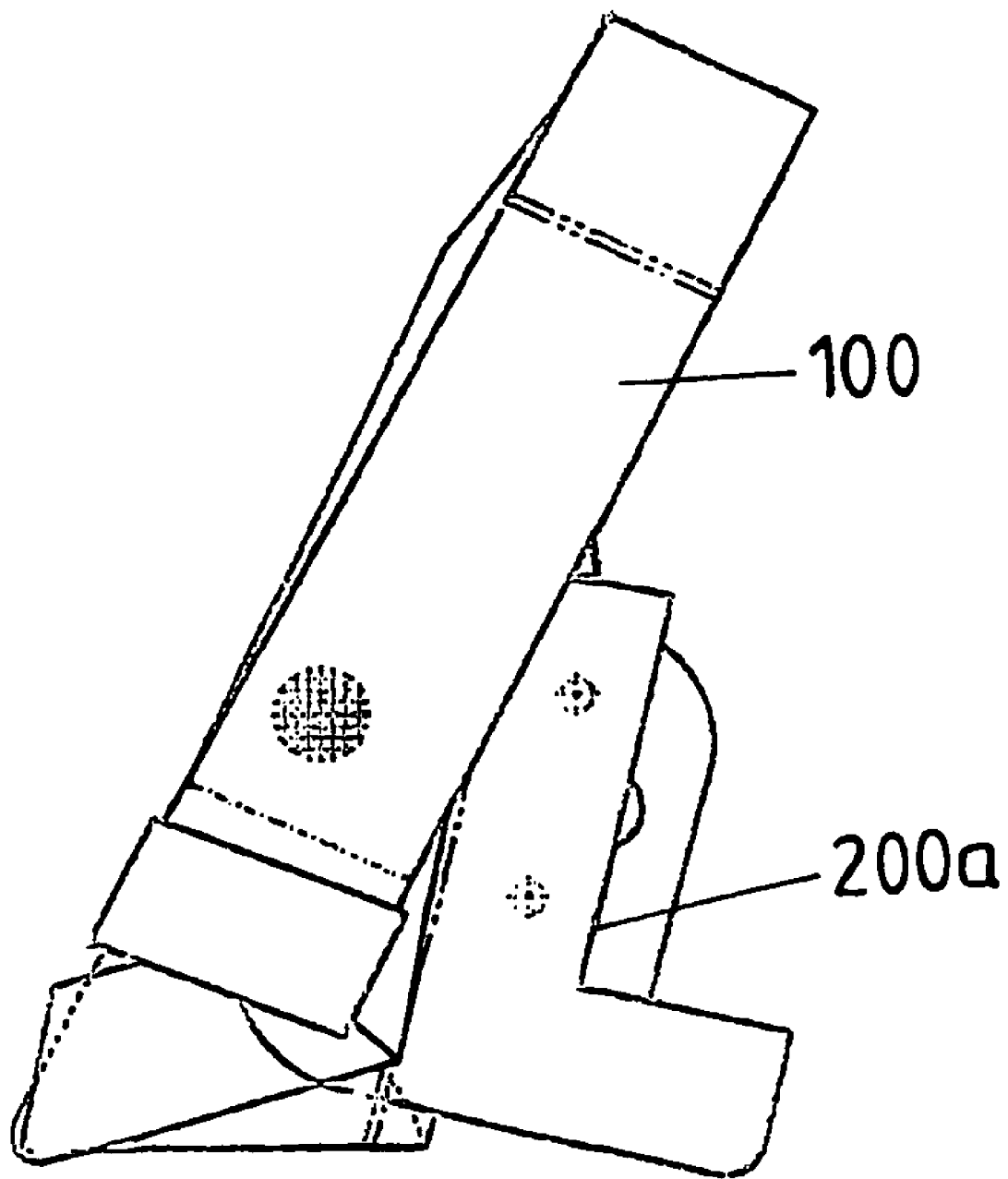
Figure 5M:
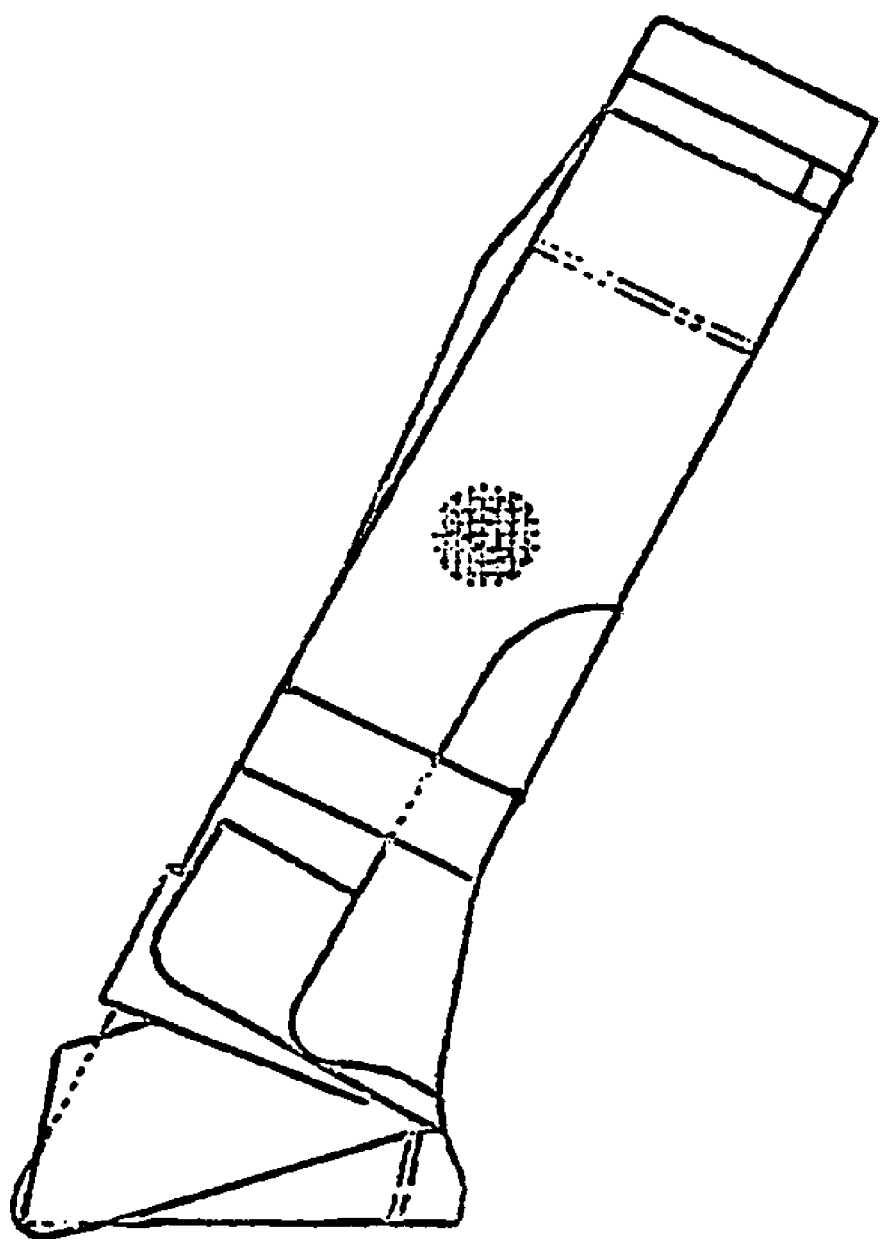
FIG. 5m shows a further embodiment for multitude folding steps at the folding of an airbag blank applying three rolled foldings according to FIG. 5l.

After generating the two (slightly) overlapping rolled foldings 3, 4, assigned to the first or the second airbag section 103, 104 of airbag 100, a folding bracing F is placed according to FIGS. 5g and 5h—considered along the vertical z, see FIG. 5a—on the upper end of airbag 100, i.e. on its (serving the protection of the head) first airbag section 103, which is rolled up by rotation around a longitudinal axis A5 along a roll direction R5 into the direction of the second (lower) airbag section 105, whereby the two rolled foldings 3, 4 formed beforehand are also rolled in and define a face side of the formed third rolled folding 5, i.e. being located at one of the ends E5 of the rolled folding 5 rolled up at last, see FIG. 5i.

Thereby, only the first rolled folding 3 is completely integrated into the third rolled folding 5 formed at last, while the second rolled folding 4 is only partially rolled into said lastly rolled folding 5.

The folding shown in FIG. 5a et seqq. differs therefore from the one explained in FIGS. 4a to 4d amongst others in the fact that according to FIG. 5a et seqq. the third rolled folding 5 formed at last (unlike the lastly formed rolled folding 2 as is the case in FIGS. 4a to 4d) does not include completely the two beforehand formed rolled foldings (3, 4 in case of FIG. 5a et seqq.) in their entire length between their both ends E5 but only on a face side in the area of one end E5. The firstly formed rolled foldings 3, 4 form therefore a frontal limitation of the rolled folding 5 formed at last.

If an airbag produced according to FIG. 5a et seqq. is filled with gas in case of a crash, so it firstly unfolds by unrolling the lastly formed rolled folding 5, whereby airbag 100—related to its built-in status in a vehicle—unfolds and extends along the vertical vehicle axis z, see FIG. 5a. Subsequently an uncoiling of the firstly formed rolled foldings 3, 4 occurs basically along the longitudinal vehicle axis, related to its built-in status in a vehicle. Thus, the unfolding of airbag 100 during filling with gas can be systematically controlled by the sequence of the unfolding processes.

According to FIGS. 5j to 5m the airbag 100 is (manifold) reverted after completion of the above described rolled folding processes in order to bring said airbag into a preferably largely compact delivering status in passing it to an assembly location in order to assemble said airbag into a motor vehicle, in particular into a motor vehicle seat.

The priority application, German Patent Application 10 2007 013 101.3, filed Mar. 14, 2007 including the specification, drawings, claims and abstract, is incorporated herein by reference in its entirety.

The invention claimed is:

1. A folded airbag for a motor vehicle, which can be inflated in case of a crash, comprising:
   a first rolled folding created by rolling up a first airbag section; and
   a second rolled folding created by rolling up a second airbag section,
   wherein first and second spatial directions, along which the first and second airbag sections are, respectively, rolled up to form a resulting rolled folding, are oriented at an angle to each other,
   wherein the first and second spatial directions are oriented to each other in an angle between 10° and substantially less than 90° or between substantially more than 90° and 170°, and
   wherein the resulting rolled folding comprises a first folded area in which both first and second rolled foldings overlap, a second folded area being formed by an area of exactly one of the first and second rolled foldings, and a third folded area being formed by an area of exactly the other of the first and second rolled foldings.

2. The folded airbag according to claim 1, wherein the first and second rolled foldings overlap each other in such a manner that the second airbag section, which forms the second rolled folding by rolling up said second airbag section, comprises at least in part the first rolled folding.

3. The folded airbag according to claim 1, wherein by rolling up the second airbag section for forming the second rolled folding at least one part of the first rolled folding is also rolled up along the second spatial direction.

4. The folded airbag according to claim 1, wherein more than two rolled foldings are provided of which at least two are rolled up along different spatial directions.

5. The folded airbag according to claim 4, wherein all rolled foldings are rolled up along different spatial directions, respectively.

\* \* \* \* \*